Jan. 3, 1939.　　　　A. KRAKAUER　　　　2,142,399
SPRING CUSHION AND MATTRESS STRUCTURE
Filed May 19, 1937
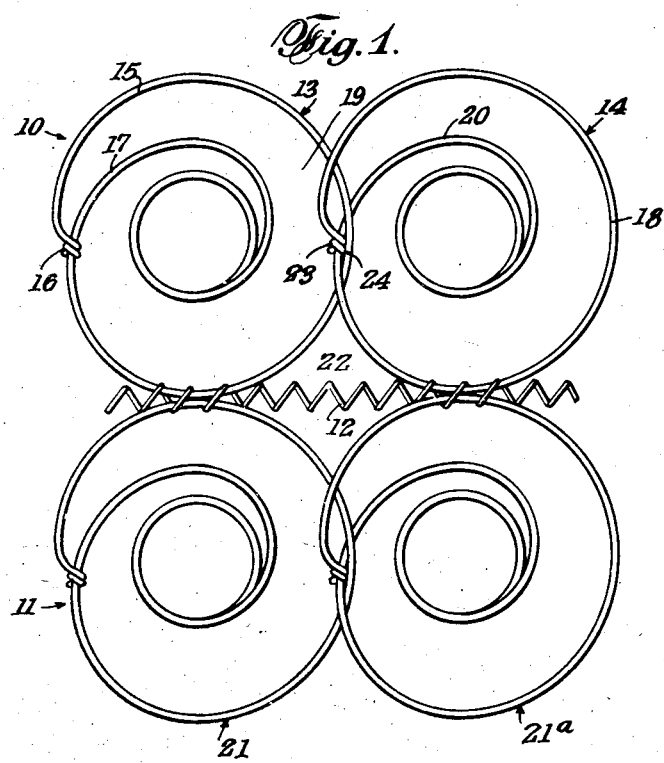
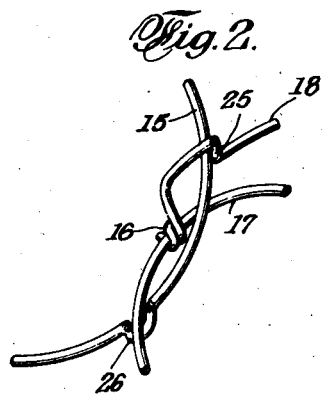
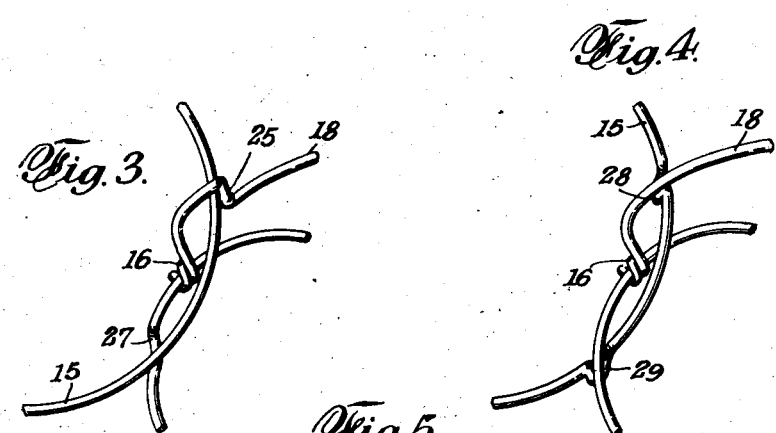
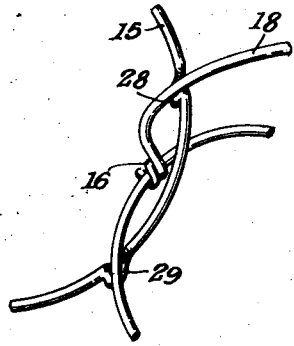
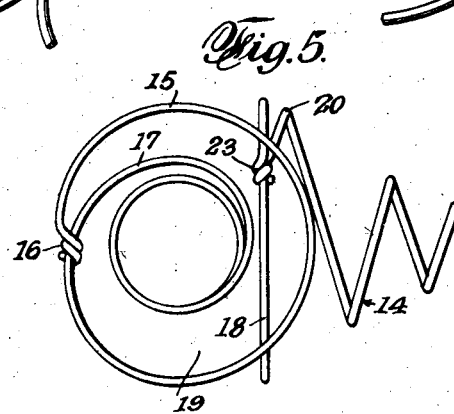
INVENTOR
*Abraham Krakauer*
BY
ATTORNEY Patented Jan. 3, 1939

2,142,399

UNITED STATES PATENT OFFICE 2,142,399

SPRING CUSHION AND MATTRESS STRUCTURE

Abraham Krakauer, Brooklyn, N. Y., assignor to Kay Manufacturing Corporation, Brooklyn, N. Y., a corporation of New York Application May 19, 1937, Serial No. 143,422

12 Claims. (Cl. 140—3)

This invention relates to spring structures and particularly to the means for adequately securing together the coil springs customarily used in mattresses, cushions and the like.

In the manufacture of padded spring mattresses, it has been the aim of the manufacturer to use as many springs as possible in the mattress to obtain maximum resilience, while at the same time keeping the resulting mattress as light in weight as possible. These aims have heretofore been inconsistent, since increase in the number of springs results in additional weight.

My invention, however, contemplates the provision of a spring structure wherein the maximum number of springs are used in the given surface area of the structure, and the further provision of such connection between the springs, that the springs may be made of comparatively light wire without loss of resiliency, and not only without increase in weight but even with a decrease in the weight of the resulting structure.

My invention further contemplates the arrangement of springs in such a manner as to minimize the spaces between springs to be bridged by the padding material.

My invention further contemplates the provision of a simple and inexpensive connection between the springs whereby the rows of springs may be hingedly connected, while adjacent springs of a row overlap so that stress upon one spring of a row is transferred in part to adjacent springs and each spring may consequently be made of comparatively light weight.

My invention further contemplates the provision of a simple method of assembling the springs, whereby each spring may be made in the customary manner without the necessity for additional operations thereon.

The various objects of my invention will be clear from the description which follows and from the acompanying drawing, in which, Fig. 1 is a top plan view of a portion of a spring structure embodying my invention, it being understood that only two of the springs of each row and only parts of two rows are shown and that as many rows and as many springs in each row may be provided as may be desired.

Fig. 2 is a fragmentary perspective view of the end coils of adjacent springs in a row showing one form of the optional stop means for preventing relative rotation of the springs.

Fig. 3 is a similar view of a modified form of the same.

Fig. 4 is a similar view of still another modified form of the same.

Fig. 5 is a top plan view of a pair of adjacent springs as they appear during the operation of passing the end coil of one through the corresponding end coil of the other.

In the practical embodiment of my invention which I have shown by way of example, a plurality of rows 10, 11 and the like of individual coil springs of the usual type are connected by means of a helical spring as 12 screwed or threaded about the uppermost end coils of the springs in two adjacent rows, a similar helical spring connecting the corresponding points of the lowermost end coils of the springs in adjacent rows. Each of the pair of adjacent springs of a row as 13, 14 have their end coils crossed, interengaged and interconnected in a very simple but efficient manner which does not interfere with the normal manufacture of the individual spring.

In other words, each of the coil springs is made in the customary manner on the usual machinery intended for that purpose, the end coil 15 of the spring being knotted, twisted or otherwise permanently secured at its extremity 16 about the next succeeding coil 17. The end coils 15 and 18 of the adjacent springs 13 and 14 are interconnected without the use of any additional connecting members except the end coils themselves. This is done in an extremely simple and inexpensive manner, and by a simple operation. For example, as shown in Fig. 5, the end coil 18 of the spring 14 may be turned into substantially vertical position, then passed through the space 19 inside of the end coil 15 and outside of the next succeeding coil 17 of the adjacent spring. The spring 14 is then turned to bring its axis into vertical position, and to turn the end coil 18 into its proper horizontal position, where it overlies the end coil 15. The coil 18 canot pass completely through the space 19 owing to the fact that said coil 18 is continued to form the next succeeding coil 20. Said succeeding coil 20 underlies the end coil 15, which is consequently arranged to pass underneath the coil 18 and over the coil 20. In other words, the end coil of one spring passes between the end coil and the next succeeding coil of the adjacent spring and inside of the secured extremity of the last-mentioned end coil in such manner that the springs can be separated only by reversing the operation, that is, by repassing the coil 18 downwardly through the coil 15.

Similarly, the lowermost end coils of the adjacent springs 13 and 14 are crossed and interconnected, whereby both springs are overlapped, with part of the end coil of each spring entering within the corresponding end coil of the adjacent spring. The springs are thereby held together against possibility of relative transverse movement and for movement together to some extent depending upon the point of application of the load thereto. The remaining adjacent springs of the row are similarly interconnected by crossing the uppermost and lowermost end coils of adjacent springs, and the springs of the next row 11 are also similarly interconnected. After the rows of springs have been thus completed, the helical springs 12 are threaded about the adjacent pairs of end coils of the springs in adjacent rows thereby engaging said end coils at points approximately 90° distant from the points where the end coils 15 and 18 cross each other.

The helical spring 12 bridges the substantially square space 22 outside of the end coils of the four springs 13, 14, 21 and 21a whereby the area of the spaces which must be bridged by the padding overlying the springs is reduced to a minimum. Preferably, when the end coils as 15 and 18 are crossed in the manner above described, the knot 23 of the end coil 18 is arranged so that it is in contact with that part of the end coil 15 which crosses within the end coil 18 and inside of the knot 23 at some point as 24, thereby preventing separation and relative rotation of the springs. Such relative rotation is further resisted by the helical spring 12.

The interconnection of the adjacent springs of a row by the crossing of the end coils thereof not only provides a maximum number of springs in the length of the row since the springs are thereby overlapped, but also makes the resulting structure rigid against possibility of buckling while nevertheless permitting a hinging action between adjacent rows of springs. Furthermore, as has been indicated, the gap between springs and rows is lessened to such an extent that there is little likelihood for the padding of the cushion or mattress sinking in the space between springs.

In order to insure further against the possibility of relative rotation of the end coils and to arrange the greater parts of the end coils at the same level, so that corresponding end coils lie substantially in the same horizontal plane, each of the end coils may be suitably indented to provide rotation preventing stops thereon. The indents or stops may be arranged in a great variety of different ways but as shown in Fig. 2, an indent as 25 is provided in the end coil 18 at a point just beyond the intersection of said end coils 15 and 18. The downward indent 25 is preferably of substantially the thickness of the wire of the coil 15 so that the remainders of the end coils 15 and 18 lie substantially in the same plane. Where the end coil 18 crosses the coil 15 below the knot 16 as viewed in Fig. 2, said end coil 15 may be similarly provided with a notch or indent 26 of substantially the depth corresponding to the thickness of the wire of the end coil 18, whereby said end coil, where it crosses the notch 26, lies in said notch and is thereby maintained at substantially the same level as that of the adjacent end coil 15.

As shown in Fig. 3, the indent 26 in the end coil 15 may be omitted, and instead a downwardly extending indent or depression as 27 made in the coil 18 at the point where the coils 15 and 18 cross each other, part of the coil 15 being received in the depression 27.

As shown in Fig. 4, the coil 15 may be indented at the two points where the coils cross each other to provide the indents or notches 28, 29 at said points of crossing or intersection. It will be understood that by providing the indents substantially upright shoulders are formed cooperating with the notch 16 to engage the adjacent coil and therefore to prevent relative rotation of the springs. It will further be understood that the various indents may be made in the end coils simultaneously with the formation of the knot 16 and an additional operation upon the springs thereby avoided.

It will further be seen that I have provided a simple spring structure, in which connection is made between adjacent springs of a row without the necessity for the use of clips or interconnecting bends on the end coils, that the connection may be simply and easily made by interlooping and crossing the end coils of adjacent springs, that by so connecting the springs, the number of springs in a row is increased and therefore the wire of the springs may be made lighter with consequent lightening of the entire structure, that by so interconnecting the springs, a structure is provided which is adequately rigid against possible buckling while permitting a hinging action between adjacent rows of springs, that the gap between springs is substantially minimized and that I have provided a structure easy and inexpensive to assemble and well adapted to meet the requirements of practical use.

While I have shown and described certain specific embodiments of my invention, I do not wish to be understood as limiting myself thereto, but intend to claim the invention as broadly as may be permitted by the state of the prior art and the scope of the appended claims.

I claim:

1. A spring structure comprising a plurality of rows of completely preformed coil springs, each row having a plurality of coil springs therein, and permanently closed end coils on each spring, adjacent springs of a row being interlocked at the corresponding end coils thereof, the end coil of one spring passing between the end coil and the next succeeding coil of one adjacent spring only of the row and into the interior of said adjacent spring, and the end coil of said adjacent spring having a part thereof overlying and arranged within the end coil of said one spring.

2. In a spring structure having a plurality of rows of preformed and closed coil springs, each having a plurality of coil springs therein, a bent extremity on each of the end coils of each spring, said extremity being bent through an angle greater than 360° about the juncture of said end coil and the next succeeding coil to permanently secure said extremity in place and to permanently close the end coil, part of the end coil of one spring overlying and being arranged within the end coil of the adjacent spring of the row and the next succeeding coil of said one spring crossing the end coil of said adjacent spring only in a downwardly inclined direction and preventing separation of said end coils.

3. A spring structure comprising a plurality of rows of preformed coil springs, each row having a plurality of coil springs, the extremity of each of the end coils of each spring having a bent portion having a plurality of turns and permanently securing said extremity to the continuation of said end coil, the end coil of each intermediate spring in each row passing between the corresponding end coil and the next succeeding coil of the adjacent spring in the row to arrange the adjacent springs of the row in overlapping relation and means for connecting the corresponding end coils of the springs in adjacent rows comprising a helical spring having convolutions passing about said end coils and hingedly connecting them together.

4. In a spring structure, a pair of overlapped coil springs each having a pair of preformed closed end coils, each of said end coils having a permanently secured extremity, the end coil of one spring passing within the end coil of the adjacent spring only and between said last-mentioned end coil and the next succeeding coil of said adjacent spring and within the secured extremity of said last-mentioned end coil.

5. In a spring structure, a pair of coil springs each having a pair of preformed closed end coils, each of said end coils having a permanently secured extremity, a portion of the end coil of one spring passing within the end coil of the adjacent spring, and a coil of said adjacent spring in part overlying and in part underlying said portion to secure said springs together in overlapping relation.

6. In a spring structure, a pair of preformed coil springs each having a pair of permanently closed end coils, the closed end coil of one spring being passed through and crossing the corresponding closed end coil of the other spring to secure said springs together in overlapping relation, and bent portions in said coils at the points of crossing thereof providing stop shoulders for preventing relative rotation of said springs.

7. In a spring structure, a plurality of rows of completely preformed coil springs, a securing portion on each of the respective ends of each of the springs twisted through a plurality of turns about and permanently secured to the upper and lower end coils thereof, the end coil of each spring being passed through and crossing the corresponding end coil of an adjacent spring in the row to arrange said end coils in disengageable intersecting relation when the structure is assembled into its operative state, and a helical spring threaded about the end coils of the springs in adjacent rows to hingedly secure said rows together.

8. The method of connecting a pair of coil springs each having an upper and a lower end coil, comprising securing the extreme end of each end coil of each spring to an adjacent part of the corresponding end coil and after the ends of the end coils have been secured passing an end coil of one spring through the corresponding end coil of the other spring and then passing the other end coil of said one spring through the other end coil of the other spring.

9. The method of interlocking the corresponding end coils of a pair of coil springs, each of said coil springs having an upper and a lower end coil each terminating in an end portion secured to an adjacent part of the end coil, comprising turning one spring relatively to the other so that the end coil of said one spring is at substantially right angles to a corresponding end coil of the other, forcing the end coil of said one spring through the corresponding end coil of the other, repeating the above-mentioned steps in connection with the other end coils of said springs, and turning said springs to arrange the axes thereof in substantially parallel relation.

10. The method of interlocking the corresponding end coils of a pair of coil springs, each of said coil springs having an upper and lower closed end coil, comprising forcing the closed end coil of said one spring through the corresponding closed end coil of the other while said end coils are arranged in intersecting planes, similarly forcing the other end coil of said one spring through the other end coil of the other spring, and turning said springs to arrange the axes thereof parallel, whereby the end coil of said other spring passes between the end coil of said one spring and the next succeeding coil of said one spring.

11. The method of interconnecting a pair of coil springs each having a pair of free ends, comprising completing the springs by securing each of said free ends to a point on the end coil from which said ends project to close the end coils, thereafter passing each of the closed end coils of one spring through the corresponding closed end coils of the other spring, and rotating said springs into relatively parallel positions and with their corresponding end coils lying in substantially the same plane.

12. The method of making a spring structure of a plurality of coil springs comprising making each of said coil springs with end coils having secured ends, assembling a row of said springs by passing the upper and lower closed end coils of each intermediate spring of a row through the respective upper and lower closed end coils of the previous spring in the row to arrange the end coil of said previous spring so that said last-mentioned end coil passes between the corresponding end coil of the next spring and the next succeeding coil of said next spring, and then assembling adjacent rows of said springs by screwing a helical spring about the adjacent parts of the end coils of the springs in the adjacent rows.

ABRAHAM KRAKAUER.